Nov. 9, 1954   K. G. McKAY   2,694,112
AMPLIFIER UTILIZING BOMBARDMENT INDUCED CONDUCTIVITY
Filed Dec. 30, 1950   2 Sheets-Sheet 1
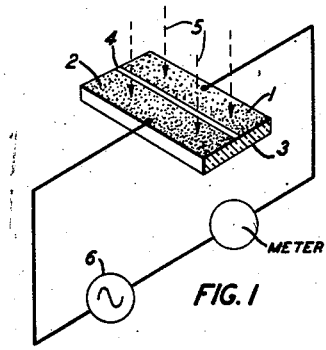
FIG. 1
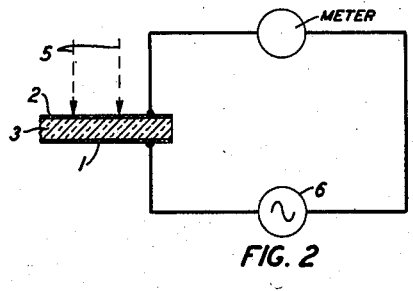
FIG. 2
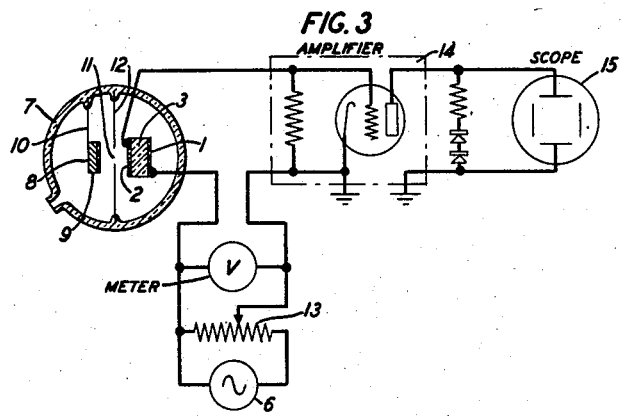
FIG. 3
FIG. 4
INVENTOR
K. G. McKAY
BY
N. D. Ewing
ATTORNEY Nov. 9, 1954  K. G. McKAY  2,694,112
AMPLIFIER UTILIZING BOMBARDMENT INDUCED CONDUCTIVITY
Filed Dec. 30, 1950  2 Sheets-Sheet 2

INVENTOR
K. G. McKAY
BY
N. D. Ewing
ATTORNEY.

United States Patent Office 2,694,112
Patented Nov. 9, 1954

2,694,112

AMPLIFIER UTILIZING BOMBARDMENT INDUCED CONDUCTIVITY

Kenneth G. McKay, Summit, N. J., assignor to Bell Telephone Laboratories, Incorporated, New York, N. Y., a corporation of New York Application December 30, 1950, Serial No. 203,628

2 Claims. (Cl. 179—171)

This invention relates to bombardment induced conductivity in solid insulators and more particularly to amplifiers of electrical energy utilizing such induced conductivity. This application is in part a continuation of my application Serial No. 789,667, filed December 4, 1947 (now Patent 2,543,039, issued February 27, 1951), and it is filed pursuant to a requirement for division in the latter application.

In the parent application, Serial No. 789,667, I disclose an improvement consisting in the use of an alternating voltage field across a bombarded solid insulator, together with bombardment of said insulator during all, or a part, of both positive and negative half cycles of the alternating voltage; or alternatively, for achieving a like effect, the use of a very thin solid insulator in conjunction with a very high field across the same. The improvement is without regard to the particular kind of radiation concerned so as, therefore, to be applicable to the use of alpha particles, beta particles, electrons, mesons, X-rays, or gamma rays, among others.

The phenomenon of bombardment induced conductivity in solid insulators is an instance of valve action. Analogously, as a vacuum tube is made conducting under the influence of electrical means independent of the voltage applied between the electrodes, in the present studied phenomena a normally insulating solid material is made conducting by the incidence of bombarding charged particles under control of conditions specific to the bombarding function rather than to the electric field induced by the electrodes bounding said solid insulator.

Similarly as a charged particle of a conventional type, as alpha, beta or electron particles, of sufficient energy can remove a valence electron from its bonds so also units (photons) of electromagnetic radiation, as in X-rays and gamma rays, may possess sufficient energy to cause the removal of valence electrons from their bonds in such a way that the solid insulator is rendered temporarily conducting.

The bombarding particles penetrate the insulator, causing a disruptive separation of the positive and negative charges specific to the atoms which are affected by said bombarding particles. These charges are drawn toward the electrodes by the potential therebetween, which sets up an electric field in the insulator; this motion of charges constitutes a conduction current which may be suitably amplified and measured by conventional apparatus.

The material chosen for the solid insulator should have a high insulating characteristic so as to be most amenable, without ambiguity, to the conditions imposed by the type of phenomena being treated. To this end, and for other reasons as well which are not fully known at this time, the insulator should have preferably good insulating qualities, and also should be preferably of a single crystal type with a high degree of chemical purity and freedom from inelastic strain or other crystal defects. These considerations commend the use of diamond, quartz, zinc sulfide, the alkali halides (including potassium chloride and potassium bromide), magnesium oxide, calcium fluoride, sodium nitrate, topaz, silver chloride, orthoclase, beryl, calcite, apatite, selenite, tourmaline, emeralds, extremely pure silicon carbide, and stibnite. Several of these substances, notatably diamond, zinc sulfide, magnesium oxide, silicon carbide, and stibnite, have been used in the basic studies of bombardment induced conductivity and there is every good reason to think that the feature of using an alternating voltage field, attributable to applicant, is applicable to each of them. This feature has been used with eminent success with a diamond insulator, using electrons as the bombarding particles. Alpha particle bombardment of diamond, zinc sulfide and magnesium oxide also has been used in the basic work in this art and applicant has found that the operation is improved by the use of the alternating voltage field of his invention, and has excellent reason to think that a similar improvement would be obtained under beta or meson particle bombardment, and under irradiation by X-rays and gamma rays.

Diamond is a favored solid insulator for this work because it can easily be obtained without sufficient impurities or imperfections to affect its high insulation resistance, or its conducting properties under bombardment. The carbon atoms therein consist each of a nucleus exhibiting fixed units of positive charge, to which two electrons are tightly bound. This core is surrounded by four valence electrons. The nucleus weighs twenty-two thousand times as much as an electron. The carbon atoms are held together by "electron pair bonds" between adjacent atoms. The insulation resistance is high because the electron bonds are very tight. As a result of this tightness very few electrons are displaced from their bonds by thermal agitation. This is not the case in, for example, metals, where a large number of electrons are continuously being displaced by thermal agitation and are relatively free to wander through the metal. This, under adequate conditions, constitutes the usual current in a metallic conducting medium.

When charged particle bombardment removes a valence electron from its bonds in an insulating target, producing a deficiency of one electron in the atomic structure immediately affected, this localized electron deficiency is called a "hole." Under an applied electric field the arrangement of the electrons is changed, and the location of any given hole will change. As a consequence, the hole may be conveniently regarded as a positive particle which is free to move, under the influence of the field. Similarly the electron freed from the bond in question constitutes a negative particle which is free to move under the influence of the field. If there is no applied field, any free electron or positive hole moves in virtue of thermal agitation and consequently has a completely random motion. Under an applied electric field there is a directional motion superposed upon the random one. The order of mobility of the electrons in diamond is 1,000 centimeters per second for a field of one volt per centimeter. For a field of $10^4$ volts per centimeter the velocity therefore is $10^7$ centimeters per second. For a diamond crystal one millimeter thick the transit time therefore would be $10^{-8}$ seconds. The mobility of the electrons is affected by the number of "traps," that is, the presence of foreign atoms or imperfections, in the crystal. If an electron gets into a trap, it takes a greater or less amount of time to get out, depending upon the thermal energy required. If the time which a free electron spends moving in the crystal before being trapped is, on the average, less than the transit time, many of the electrons freed by the bombarding particle will effectively move only part of the distance through the crystal and thus will not actually be collected on an electrode. Although this movement of charge through part of the crystal will contribute to the total observable conduction current, the contribution will be less than if the electrons had been collected on an electrode. Similar considerations concerning mobility and trapping also apply to conduction by positive holes. In order to minimize the number of effective traps in a given target, so as to realize a substantial conductive current, length of path in the target, between the electrodes, should be made as small as possible.

In accordance with the present invention, there is provided an improved amplifier of the induced bombardment conductivity type, in which an alternating voltage is established across the insulator target or in which alternatively a very high electrical field is employed in conjunction with a very thin insulator target.

One embodiment of the invention described in detail hereinafter comprises an evacuated envelope including an electron gun for producing a directed beam of bombarding radiation of any of the types described, in the path of which beam is disposed an insulating crystal element having electrodes coated or plated on its opposite faces, to one of which is connected an alternating voltage source and to the other of which is connected a utilization circuit. The bombarding beam is signal-modulated through the control grid of the electron gun.

In accordance with a modification of the aforesaid embodiment, it has been found advantageous to replace the bombarded electrode contact by a low impedance conduction path provided by secondary electrons produced in the insulator target by a second beam and flowing to a collector electrode which is electrically coupled to the utilization circuit. For this purpose, a low voltage high current beam is employed which is broadly focused on the inner target surface in addition to the beam of bombarding radiation.

Another modification of the present invention is a high gain amplifier of the beam-pentode type, in which a pair of insulating crystal elements of the type previously described, each having a pair of electrodes plated thereon, replaces the conventional plate elements.

A satisfactory theoretical picture explanatory of the advantages derived from the use of alternating, as compared with direct voltages, as in accordance with the invention, is not now completely available. It is, of course, recognized that such an explanation, or a physical picture of the operation in question, is not necessary to support the present specification and claims, under the patent statutes. However, it is evident that the adverse condition which tends to be, and is, remedied by the use of the alternating voltage across the solid insulator electrodes, is of the nature of a polarization or a space charge; that is, an accumulation of a net excess of either positive or negative electrical charge in a certain region or regions of the crystal. The following rough hypothesis, which is amply justified by observations so far, may be helpful.

Immediately after applying a steady voltage most of the electrons which are freed by bombardment of the surface layer just beneath the thin cathode (negative electrode) move through the crystal from their point of origin near the cathode and are collected on the anode (the other electrode). However, some do not. Presumably these latter are trapped, and rendered temporarily immobile, by imperfections or impurity atoms in the body of the crystal. Electrons therefore tend to accumulate in regions of the crystal other than the very thin layer near the bombarded surface where they are freed. This is true, of course, without regard to whether the electrodes are in side-by-side presentation or in opposite presentation, with respect to the intervening crystal body. The crystal is then said to be polarized, that is, this accumulation of negative charges in the region between the source of the electrons and the anode opposes the force of the latter in attracting electrons away from this source. This effect is cumulative so that with the passage of time newly freed electrons are unable to move far from their source and only a small conduction current is observed. It is in this sense that the effective yield of internally freed electrons is observed to be relatively low with a steady voltage across the crystal.

This undesirable situation is disturbed if the applied voltage is reversed and the crystal is again bombarded. Now positive holes, instead of electrons as before, move across the crystal toward the back contact of the crystal which, before, constituted the anode but after reversal of the voltage would tend to function as the cathode. Some of these are trapped, similarly as the electrons in the earlier phase, thus setting up a positive space charge or polarization tending to neutralize the negative charge or polarization of the first phase, although some of the incomplete atoms which give rise to the positive holes may actually recombine with the trapped electrons. In either case, the negative space charge set up by the trapped electrons is greatly reduced or eliminated and the further reversal of applied voltage to restore the initial phase will thus cause newly freed electrons to move across the crystal until the opposing space charge again begins to form. Thus if an alternating voltage of sufficiently high frequency be applied across the crystal in the bombardment, there is not time for an appreciable space charge to accumulate before the voltage is reversed and the space charge is partially or completely neutralized. Hence the effective yield of electrons is relatively large at all times when the applied voltage is such as to cause them to flow across all, or an appreciable part, of the crystal, providing this voltage alternates at a sufficiently high frequency. It has been determined that under certain experimental conditions a frequency of 20 cycles or greater is adequate.

For optimum space charge neutralization, the extent of the primary bombardment, both in time and intensity, during the negative half cycle of the alternating voltage, must be adjusted with relation to the extent of the primary bombardment during the positive half cycle. It may be desirable to use a direct potential bias superimposed on the alternating voltage, since this would render the peak voltages of the positive and negative half cycle different in absolute magnitude; and that this tends to result in a more homogeneous neutralization of the space charge throughout the thickness of the crystal. The reason for such a bias, at least so far as concerns this latter effect, is of course based on the difference between electrons and positive holes in their probability of being trapped.

Throughout the above discussion it has been assumed that the penetration of the primary bombarding particles is negligible. However, in a sufficiently thin crystal, this is not true, and the current flow from the point of origin back to the bombarded crystal face becomes important. The above argument still applies to this condition, however, except that account of course has to be taken of the current implied by the return of electrons or positive holes from their points of origin back to the bombarded face, and the corresponding neutralization of space charge which this brings about.

The line of argument above is equally relevant to the specific applications to be disclosed in detail below. It must be emphasized that the use of the term "alternating voltage" should be interpreted in its broadest sense as applying not only to a sinusoidal wave form but also to other recurrent wave forms such as square waves or more complex forms. The principal requirement on the field appears to be that at a certain critical time the field across the crystal must be in a certain direction and that at some later critical time, the field should be in the opposite direction, these times being correlated with the extent of primary bombardment. The choice of types of alternating voltage wave forms becomes significant for example in the application of an alternating field to a crystal bombarded by alpha particles. Because of the random distribution in time of the alpha particles, sinusoidal modulation is not particularly applicable although square wave modulation is found to be very useful.

Another method of overcoming the effects of space charge is to use very thin crystals in conjunction with high fields applied across the same. For added effect the field may be an alternating voltage field. It is contemplated that an extremely high field across the thin crystals might actually nullify the effects of space charge, even when the field is a direct voltage field. For example, a field ranging almost as high as that which will cause dielectric breakdown under bombardment (of the order of $10^6$ volts per centimeter) might be applied between electrodes separated by from $10^{-4}$ to $10^{-3}$ centimeters. In this case such a field would be so large that, even if all the traps in the crystal were full, the resulting opposing space charge field would be small by comparison. Moreover, if the thickness of the crystal is of the same order of magnitude as the depth of penetration of the particles of the primary beam, currents of electrons and positive holes will accordingly be travelling in opposite directions in the same region in the crystal and will thereby tend to neutralize the accumulated space charge.

With reference to the use of alternating voltage with electron bombardment induced conductivity, it is desirable to estimate the order of magnitude of alternating voltage and frequency that can be applied across the crystal and be expected to yield useful results. The figure of 20 cycles per second suggested above is in contemplation of the use of diamond as the crystal substance, although there is reason to think that comparable values would pertain to other solid insulators adaptable for this purpose. The same is true of the figures now to be presented.

The limits to be imposed on the voltage and frequency tend to be functions of the bombarding current, the induced conduction current, and the geometry of the crystal. Nevertheless, it would appear feasible when using small values of the above currents to go down to frequencies of a few cycles per second, that is, considerably less than the above indicated 20 cycles per second. The upper frequency limit will probably be determined by the electron transit time between the electrodes. Thus frequencies of the order of $10^8$ cycles per second are certainly practicable and probably frequencies of as large as $10^9$ cycles per second could be used. Usable field strength across the crystal will probably have a lower limit of the order of $10^3$ volts per centimeter. The upper limit will probably be set by dielectric breakdown of the crystal, which would tend to occur at around $10^6$ volts per centimeter. In terms of practicable crystal electrode separation, the actual applied voltages should range from something less than 100 volts up to several thousand volts. The useful bombarding voltage range, that is, range of energies of primary electrons, will probably run from something less than 1,000 volts up to many kilovolts. Applicant and his confreres commonly used from 10 to 15 kilovolts, although there is reason to think that it would be practicable to go to very much higher voltages.

Other objects and teachings of the invention are derivable from the detailed description hereinafter following, with reference to the accompanying drawings in which:

Figs. 1 and 2 illustrate two preferred methods of applying the necessary alternating difference of potential (alternating voltage) to the surfaces or parts of surfaces of the insulators in question, with relation to the incidence of the bombarding particle;

Fig. 3 illustrates a system for indicating the presence of conductivity in an insulator which is affected by the bombardment of charged particles;

Figs. 4 and 5 illustrate an amplifier utilizing the bombardment induced conductivity principle in accordance with the invention, Fig. 4 illustrating the circuits and structures immediately associated with the bombardment inducing conductivity function and Fig. 5 illustrating an employment of these circuits and structures in a complete amplifier organization;

Figure 5:
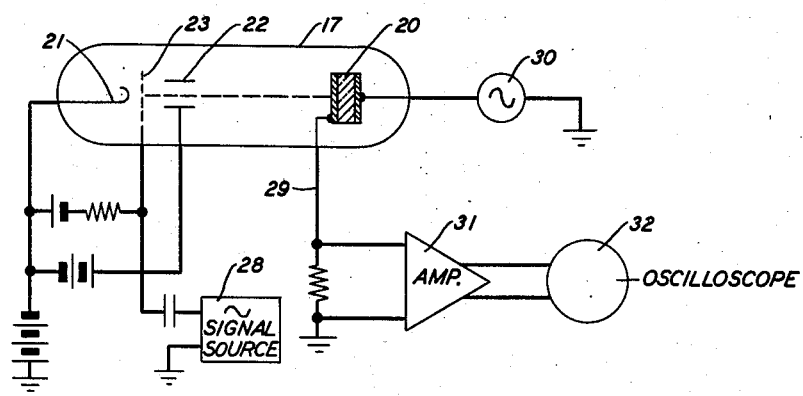

As has been said, the incident ray or beam which produces, by bombardment thereof, induced conductivity in a solid insulator (diamond or the like), may almost impartially be made up of any one of various common types of radiation. This includes ordinary electrons as typified by cathode emanations in the usual electronic devices, beta particles which are essentially high speed electrons, and alpha particles which are positively charged particles. Alpha and beta particles usually, and as contemplated by the present disclosure, emanate from radioactive material.

Figs. 1 and 2 illustrate two kinds of electrode systems that may be almost impartially used in any of the systems above described, although a particular choice may be urged by particular practical considerations. These two systems differ in the nature of the coupling of the electrodes to the solid dielectric substance on which they are superposed. In Fig. 1 the two electrodes are mounted in a side-by-side presentation on the same surface of the solid insulator in question, which will be here assumed to be a diamond as in other figures unless specific notice is given to the contrary. In this arrangement the conduction current flows only near the bombarded surface of the diamond, whereas in Fig. 2 the electrodes are mounted on opposed surfaces of the diamond so that the conduction current represents a phenomenon existing throughout the mass of the diamond.

Referring to Fig. 1 more specifically, two conducting metal film electrodes 1 and 2 are mounted on one surface of the insulator 3. The gap 4 separating the electrodes is relatively small and various widths from .001 to .008 inch have been successfully used in bombardment induced conductivity tests.

These electrodes may be prepared by dividing the diamond surface roughly in half by stretching a wire of appropriate diameter across and in close contact with the surface and then evaporating a conducting metal layer, in vacuum, onto said surface. This layer can be made so thin as to be semitransparent, provided its electrical resistance is so low as not to affect its electrical performance unfavorably. The shadow cast by the wire provides a gap when the wire is removed. This gap would have constant width and represent a uniformly high resistance thereacross at any point.

The charged particles are assumed to conform to a ray or beam indicated generally by reference numeral 5, which beam is incident on the diamond surface. Of course the beam tends to be most effective where it is incident on the diamond surface at the gap but, depending on the type of charged particles, the electrodes would not necessarily impose a substantial barrier; however, the electrode system of Fig. 1 requires that the bombarding particles strike the gap or very closely adjacent thereto. Later numbered figures will show, most specifically and in detail, organizations including the elements which are here shown to a large extent diagrammatically. The angle of incidence is not critical.

Moderate alternating voltages applied between these electrodes by source 6 produce relatively high alternating electric fields in the top surface layers of the diamond and the resultant induced conductivity pulses observed in the indicating means, which is diagrammatically indicated as a meter, pass across only these surface layers. In the statement of invention above, certain quantitative values, or their criteria, have been indicated, this applying not only to this figure but to the other figures as well.

Fig. 2 presents a second type of electrode placement. Here the electrodes 1 and 2 are placed on opposite sides of the diamond 3. A typical diamond specimen for this purpose might be about one-quarter inch in either principal dimension and about .020 inch thick. Thus a potential difference of 100 volts from alternating voltage source 6, across these electrodes, will produce a uniform electric field of about 2,000 volts per centimeter throughout the body of the diamond. In this type of electrode placement the induced conductivity pulses, observed in the meter indicating device shown, pass in alternate directions through the body of the diamond as distinguished from the Fig. 1 placement in which the pulses pass in the region of the front surface and alternately in directions along said surface.

In Fig. 3, illustrating a practical embodiment of a system operating according to the principles enunciated with respect to Figs. 1 and 2, like elements are, again, designated by like reference characters. The diamond 3 is coated with metallic electrodes 1 and 2 as in Fig. 2. The whole is mounted in an evacuated receptacle 7. The charged particle source 8, first assumed as the source of alpha particles, may consist of a silver sheet 9 on which is deposited a layer of radium sulfate having a given density of radium atoms (in a typical instance, 12 micrograms of radium per square inch). Of course other sources of alpha particle emanations are well known in the art and may impartially be used in the Fig. 3 organization. In fact said organization may well be used to explore the possibilities as to new sources of said emanations. The reference numeral 10 indicates diagrammatically a support for the silver sheet. In the prior art there are adequate teachings of mountings similar to this and the other elements here disclosed in an evacuated container. Other facilities, likewise taught by the prior art could be used to advantage, such as a magnetic control means to determine the particular direction of incidence of the particles on the diamond, or even to adjust the position of the alpha particle source in apposition to the aperture 11 in diaphragm-like element 12 for further determining and limiting the precise coaction of the beam of charged particles and the diamond.

The same illustration is applicable to the use of a beta particle source and in this instance the element 9 could have the form of a piece of glass on which a minute quantity of artificially radioactive strontium has been deposited. The same teaching extends, of course, to other sources of charged particles or electromagnetic radiation such as gamma or X-rays.

In this figure, the alternating-current source 6 functions similarly as the like numbered source in Figs. 1 and 2 to apply the desired voltage across the diamond, that is, between the electrodes thereof. To suit the teaching of this figure, which discloses a more elaborate and complete organization than that of Figs. 1 and 2, the potentiometer 13 may be used as shown to determine a desired fractional part of the voltage of the primary source, the voltage impressed therefrom being indicated by the voltmeter V. Of course, in the specific instance of Fig. 3, the bombarding particles penetrate the exposed electrode before affecting the diamond, this, of course, not representing a significant departure from the alternative in which the diamond is directly bombarded, providing this electrode be sufficiently thin. The detecting circuit may comprise amplifier 14 and cathode-ray oscilloscope or the like 15, both shown diagrammatically to suggest the comparatively impartial choice of specific means to achieve these functions.

It is not a rigid requirement that the container be evacuated. In practice, a rough vacuum is produced merely to eliminate small induced conductivity pulses caused by ionization of the air produced by the charged particles in their transit to the diamond. These small effects may alternatively, or in cooperation with the use of a vacuum, be largely eliminated by mounting the particle source as close as practicable to the diamond, this, therefore, requiring that the diamond 3, source 8, and diaphragm 12 all be very closely interspaced.

Vertical cusps in the oscilloscope provide a measure of the intensity of any given pulse when the bombarded electrode is connected to the negative side of the source, and a reversal of the relative polarity of the electrodes caused a reversal of the pattern. The reversal of polarity at an adequate rate, thus implying the use of an alternating voltage source, results in the improved qualities of the organization that have been pointed out hereinbefore.

Figs. 4 and 5 illustrate an amplifier of the present invention, employing alternating voltage across the solid insulator which here is a diamond with an evaporated gold electrode on either face as the diamond is presented to the bombarding electrons. The amplifier may be considered as applicant's version of the prototype amplifier disclosed in Figs. 6 and 7 of D. E. Wooldridge Patent 2,537,388, issued January 9, 1951, which was cited in applicant's parent patent 2,543,039.

Fig. 4 discloses a vacuum tube with assembled amplifier elements which may be used in the organization of the invention, while Fig. 5 discloses the amplifier organization as a whole, which demonstrates the usefulness of the circuit and structure of Fig. 4 in the amplifying function. In Fig. 5 the elements of the vacuum tube of Fig. 4 which are specific to the functions of producing, conforming and accelerating the electron beam in question are shown in a simplified form and with the omission of the less essential elements, this only in the interest of a clearer disclosure of the organization as a whole and to emphasize the generality of the type of electron gun, and its immediately accessory elements, that may be employed. In this amplifier, while, as above stated, the diamond crystal electrode should be impressed by an alternating voltage, as in accordance with the invention, it should be understood that this should not be taken as specifying a particular alternating voltage wave form, since it may be sinusoidal, square wave, or of some other form of which there is a large choice. Similarly, it should be understood, without further specific statement as to same, that the signal to be amplified, and which is applied to the grid of Figs. 4 and 5 by the "signal source" of Fig. 5, may similarly be sinusoidal, a square wave, and the like and more particularly the organization may be an amplifier of pulse waves. If the two above voltages are both sinusoidal, the output will contain not only the two fundamental frequencies but also their modulation products because of the non-linear amplitude characteristic of the crystal. The organization can thus be used as a modulator in the usual sense, or, if all the frequencies except the signal frequency be filtered out, the output will be an amplified version of the input signal and in this way is a simple amplifier.

In Fig. 4 the vacuum tube closure member 17 is comparable to the closure member of the conventional vacuum tube. A vacuum tube is here necessary, as it was not in the earlier numbered figures which illustrate apparatus utilizing alpha and beta particles, because here the charged particles are electrons emanating from the usual cathode source as in conventional vacuum tubes. Reference numeral 18 indicates generally an electron gun of a type which is customary in vacuum tubes which generate and utilize a conformed cathode ray or beam. The gun conforms and directs the beam so as to impinge on the solid insulator 20 through diaphragm-like element 19, which functions similarly, for example, as element 12 in Fig. 3. The conditions affecting this solid insulator are similar to those specific to the earlier disclosed species of the invention, the impingement of the electrons being reflected in amplified form as the bombardment induced current inherent in the operation. In a particular experiment by applicant, a diamond was used which was coated with two narrowly separated electrodes constituted by evaporated gold on the diamond face presented to the incident electron beam which were interconnected so as effectively to constitute a single electrode, together with one similar electrode on the opposite face of the diamond. Alternatively, other arrangements of dielectric and electrodes may be used within the teachings of the earlier numbered figures and, in addition, there is a wide choice of solid insulator material.

The electron gun in question, as specifically disclosed in Fig. 4 conforms to conventional practice for such electron guns as used for a variety of purposes. The particular gun shown, in fact, conforms to a well-known Radio Corporation of America technique as illustrated in some of their tubes. Something very much like it is also disclosed in Patent No. 2,458,652 of R. W. Sears, issued January 11, 1949, in which see either Fig. 1 or Fig. 8. The cathode 21 may be indirectly heated, as disclosed, or be of the filamentary type. The electron emanations are urged outwardly and concentrated by anode 22, beyond which the beam passes to the diamond crystal 20 as has been disclosed. Electrode 23 is the grid or control device on which, as will be shown in Fig. 5 the signal wave to be amplified is impressed. By it a true density modulation of the electrons in the beam is achieved. Associated with the anode 22, or supplementing it, are the focussing and accelerating electrodes 24 and 25, the latter in two parts as shown each comprising a perforated disk-like structure. The deflection plates 26 cooperate with each other and with the other gun structure, for directing the electron beam. Silver accelerating rings 27 are formed by deposit on the inner wall of the vacuum tube. Their function is similar to that of other elements shown as contributing to the concentrating and forming function. All of the structure which affects the electron beam, as shown in Fig. 4, has been found useful by applicant in the amplifier of this disclosure although, as should be obvious, and as will be indicated in Fig. 5 disclosing a practical organization using this vacuum tube, not all of the elements here disclosed are necessary. The particular connections of the gun elements and the silver accelerating rings to their corresponding sources, and therefore the ordering of the relative potentials, are not shown because, partly, they are quite obvious from the prior art but also because Fig. 5 will show the connections of the more essential parts of the structure. The above Sears patent has a detailed disclosure of the electrical connections of this structure.

In Fig. 5 the amplifier organization contemplated by Fig. 4 is disclosed. Therein parts corresponding to those disclosed in Fig. 4 are identically designated. The showing is more or less diagrammatic as to the parts taken from Fig. 4 both as to their particular showing and as to the choice of parts to be so disclosed. The circuits may be greatly elaborated if desired, and in an obvious way, from the above description, with resultant benefit in special circumstances. The essential electron gun elements and their interconnections and the necessary provision for establishing their potentials are shown in this figure. As representing what is old in the art, no further description is deemed necessary. The signal source 28 provides means for impressing a signal wave on the grid 23 to permit the operating of the amplifier organization as above described. That is, the signal wave, of whatever form impressed, density modulates the electron stream and therefore correspondingly varies the number of electrons incident on the diamond crystal 20. The electron bombardment induced conductivity therein is reflected by a correspondingly varying current in lead 29. The electric field across the crystal electrodes, which cooperates, as has been explained, with the electrons penetrating the crystal, to achieve the bombardment induced conductivity effect, results from the use of the alternating voltage source 30, which, as has been described, may suit a variety of conditions as to a particular wave shape of the voltage involved. This is a very important ingredient of the invention, as pointed out in the statement of the invention, as very greatly increasing the yield over the alternative using direct potential.

Under the conditions of one experiment, that is with the primary beam current of one microampere, pulse length of one microsecond, recurrence frequency 4000 cycles per second, an alternating voltage of frequency as low as 20 cycles per second applied across the crystal was sufficient to prevent the formation of large opposing polarization fields which would substantially reduce the internal yield. Thus the instantaneous current due to conduction by electrons obtained at a given peak alternating voltage applied field was approximately ten times that obtained with the same direct voltage field across the crystal.

The maximum value of the voltage which can be applied across the crystal is, as a practical matter, and in the case of a direct voltage source, set by the amplitude of the initial large fluctuation current through or across the surface of the crystal upon connection of the source to the electrodes. The corresponding maximum peak alternating voltage was found to be several times this limiting maximum direct voltage and this contributed to the favorable results achieved. For example, using 14 kilovolts bombarding electrons at a peak alternating voltage of about 1170 volts across the crystal, a positive internal yield of the equivalent of 580 conduction electrons passing completely through the crystal for each bombarding electron has been obtained where a positive yield is defined as that in which the conduction electrons travel in the same direction through the crystal as do the bombarding electrons.

It should be understood that the amplifying action here concerned has no relationship to the amplifying action inherent in a conventional vacuum tube, which the organization would somewhat resemble without the diamond crystal. On the contrary, the amplifying action results from the inherent ability of the solid dielectric under the conditions imposed to become conductive when bombarded by the electrons. The impressed signal wave partakes of this amplification, the eventual conductivity current reflecting, in amplified form, said signal wave. The device can be used as a modulator by utilizing the non-linear amplitude characteristics of the crystal. The conductivity current in lead 29 may be amplified by element 31 and indicated by oscilloscope or the like 32 similarly as in the earlier numbered figures. It is assumed that the amplifier as here shown diagrammatically may be elaborated as desired to determine a particular type of output, depending on whether straight amplification or modulation is desired. Of course, other types of translating devices than the oscilloscope disclosed may be used. The showing here used represents the set-up of an experiment especially performed by applicant to demonstrate the existence of the amplifying action.

Figure 6:
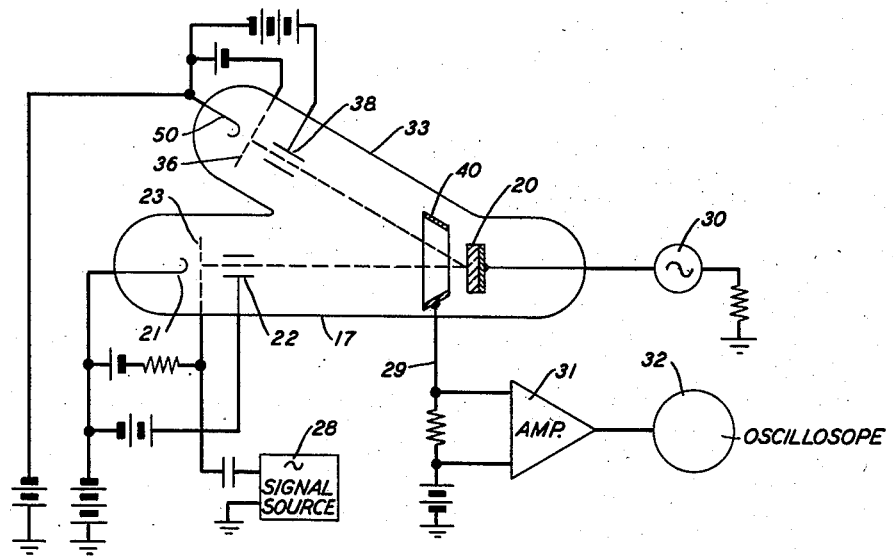
Fig. 6 is an alternative form of the amplifier circuit illustrated in Figs. 4 and 5 in which the inner contacting electrode of the bombarded insulator is replaced by beam-stimulated secondary emission from the said insulator and a collector for the same.

A modification of the improved form of bombardment conduction amplifier described in the preceding paragraphs with reference to Figs. 4 and 5 is shown in Fig. 6 of the drawings, which has as its principal feature of difference from the former the replacement of the inner electrode of the crystal insulator target 20 by a low-impedance conduction path provided by secondary emission emanating from the target and flowing to a collector electrode. The said secondary emission is induced in the target by means of low voltage high current beam of electrons focused broadly thereon by a second electron gun included in an extended portion of the envelope enclosing the gun which produces the bombarding beam, the target, and the other elements of the system.

Referring in detail to Fig. 6, the electron gun producing the beam which is directed to induce secondary radiation in the target 20 and which will be known hereinafter as the "holding beam" as differentiated from the bombarding beam comprises a cathode 50, a control grid 36, and a cylindrical focussing electrode 38, all of which are enclosed in the extended portion 33 which extends obliquely outward from the evacuated glass envelope 17 at such an angle as to enable irradiation of the inner surface of target 20 without presenting interference to the bombarding beam. Such an electron gun may assume any one of a number of forms well known in the art, such as, for example, one of the arrangements described in detail in the aforementioned Sears Patent 2,458,652.

The beam from the cathode 50 is so focussed by the positively biased focussing electrode 38 as to broadly cover the inner surface of the insulator element 20. Cathode 50, which is usually biased a few thousand volts negative with respect to the insulator 20, provides electrons of sufficient energy to induce a secondary emission in the target having a coefficient of the order of unity. Optimum operation is obtained at what is known as the "second cross-over point," referring to a graphical representation of secondary radiation. The meaning of this phrase may be explained as follows. As the potential applied to the primary electrons of the "holding" beam is gradually increased from zero, the number of secondary electrons emitted by the target also increases, reaching a maximum at which the coefficient of secondary emission is somewhat in excess of unity, and then gradually decreasing, passing a second time through a point at which the coefficient is unity. The "second cross-over point" is preferred to the first since operation at the latter is unstable.

The secondary emission emanating from the target 20 is collected by the electrode 40, which may, for example, take the form of a truncated hollow cone, the inner surface of which is disposed close to the inner face of the insulator 20 to receive the secondary electrons emitted therefrom, but which has a sufficiently wide opening to be substantially out of range of the bombarding beam. The current density of the "holding" beam should be sufficient to provide an impedance between the target 20 and collector 40 which is low compared with the effective impedance set up through the crystal as the result of bombardment. For best operation, the ratio of the current density in the holding beam to that of the bombarding beam should be of the order of 1000 to 1. For example, if the bombarding beam has a current density of the order of microamperes, the current density of the "holding" beam should be of the order of milliamperes. In order to maintain the flow of secondary electrons in the desired direction, the collector electrode 40 is biased positively with respect to the target. For example, the cathode 50 may be maintained at a potential of the order of a kilovolt negative with respect to the target 20, whereas the collector electrode is maintained at a potential of the order of a kilovolt positive relative to the said target. Connection is made from the collector 40 through the lead 29 to the output or load resistance, as in previously described embodiments.

It is apparent that the bombarding electron gun, the target, and other elements of the system are similar in structure and function to like numbered elements shown in Figs. 4 and 5 and described with reference thereto.

The system operates in a manner largely similar to the system described with reference to Figs. 4 and 5. When a current of electrons or holes is generated in the insulator 20 by the bombarding beam from the cathode 21, the potential of the inner surface of the element 20 varies in accordance with variations in the current density of the beam impressed by the modulating signal from source 28; and it also varies in accordance with the alternating voltage impressed from the source 30. In the presently described embodiment, due to the stimulation produced by the low voltage high current beam from the cathode 50, secondary electrons are emitted from the surface of insulator 20 and flow to the positively biased collector 40 until a stable energy state is established. This secondary electron current, which is proportional to potential variations across the insulator 20 and hence is an amplified replica of the signal from the source 28 modulated by the impressed alternating current from source 30, passes through the lead 29 into the output circuit.

Such an arrangement has certain advantages over the arrangement previously described with reference to Figs. 4 and 5, namely, that the effect on the insulator due to the bombarding beam is more pronounced with the removal of the inner electrode which operated to absorb part of the bombarding radiation and further that it is technically simplier in some instances to irradiate the insulator uniformly with electrons than to evaporate or plate a uniform electrode film in contact with the surface.

Figure 7:
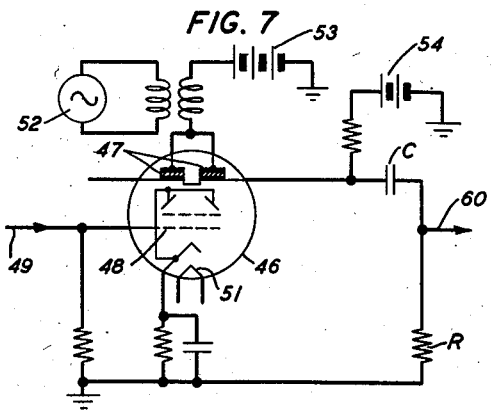
Fig. 7 illustrates the application of the principles of the present invention to a high gain amplifier.

Fig. 7 illustrates a high gain amplifier of the invention, high gain because of the inherent effective transconductance $g_m$ superposed on the transconductance $g_m$ of the tube circuit with which it is used, which tube may be a conventional type of high $g_m$ beam-pentode with the diamond crystals of the invention replacing the conventional plates thereof, as will be described. With a beam-pentode $g_m$ of five thousand micromhos and with a crystal gain of at least ten, as has been taught by the earlier part of this specification, the organization has an effective $g_m$ of fifty thousand micromhos and with pratically no increase in undesirable capacity effect.

In Fig. 7, the tube 46 and its contents, as characterized above, may be a conventional beam-pentode tube except for the replacement of the plates thereof by the solid insulators of the invention, assumed to be diamond crystals in the instant case. The adaptation of the beam pentode is not a rigid requirement, although urged by the fact that it has a small volume although characterized by a high $g_m$, and by the fact that its use of discrete plates (the electron receivers) while retaining much of the benefit of a complete cylindrical plate, easily lends itself to the use of the solid insulators of the invention to replace the plates. It should be noted however that, consistently with the fact that a beam-pentode type of a tube is not necessary, it is also not necessary to employ two solid insulators. It should be also understood that the beam type of tube as shown in Fig. 7 is highly diagrammatic and that actually the two diamond crystals, simulating the conventional plates, would, in a cross section of the tube, occur on opposite sides of the center, the other elements here shown below the diamond crystals being likewise not shown accurately in their geometrical relationships.

The signal wave to be amplified, contemplated as a continuously modulated wave (rather than as a pulse wave, for example) or any other type of continuous wave, is impressed on a conventional control grid 48 from circuit 49. The output wave is taken off by circuit 60 which is related to the diamonds 47 (corresponding to the normal anode or plates of the beam-pentode) and the cathode 51 through condenser C and resistance R. Impedances C and R, besides perfecting the proper impedance relationships for efficient energy translation, have such values as effectively to filter out or reject the relatively low frequency wave from source 52. The alternating voltage from said source 52, as reflected in a corresponding alternating voltage across the diamonds, is perhaps the most essential feature of the invention as to this species. As has been explained with reference to other species of the invention, it very greatly promotes the action of bombardment induced conductivity in the diamonds and, here, effectively increases the gain of the amplifier, as otherwise constituted, by a factor of at least ten. Owing to the non-linear characteristics of the crystal or crystals, this output wave consists of a component of the signal frequencies, a component of the alternating current field frequency arising from source 52 and, intermodulation products of these frequencies. Means for utilization of the signal frequencies component, obtained directly or by demodulation, are well known in the prior art.

While it is essential, according to the invention, that alternating potentials be thus impressed across the diamonds (or diamond if only one is used) it may well be that this alternating voltage will be found to be superposed on a net direct voltage, depending on the relative values of the direct voltages from sources 53 and 54. Source 54 of course is necessary on the diamond electrodes facing the cathode to insure bombardment of the diamonds by electrons having an adequate velocity. It therefore functions somewhat as the plate source in the prototype beam-pentode. The function of source 53 is to provide the most suitable relation between the peak positive and peak negative voltages of the alternating field applied across the crystal to obtain optimum induced conductivity consistent with the particular mode of operation of the amplifier tube. The actual values of the potential sources will depend upon the circuit constants, the properties of the tube and the properties of the crystal or crystals.

What is claimed is:

1. An amplifier comprising in combination a solid electrical insulator, means including an alternating current generator for applying alternating biasing voltage having a frequency of at least 20 cycles per second across at least a portion of said insulator, means for bombarding said insulator with a beam of electrically charged particles, a source of signal waves to be amplified, means comprising a control electrode coupled to said source and disposed in the path of said beam for density modulating said beam in accordance with the waves of said source thereby varying the number of said charged particles incident on said insulator, and current responsive means coupled to said insulator for receiving and utilizing the amplified signal waves generated in said insulator.

2. The combination in accordance with claim 1 including filtering means connected to said current responsive means, and proportioned to exclude the frequency of said alternating biasing voltage.

References Cited in the file of this patent

UNITED STATES PATENTS

| Number | Name | Date |
|---|---|---|
| 2,543,039 | McKay | Feb. 27, 1931 |
| 2,537,388 | Wooldridge | Jan. 9, 1951 |

FOREIGN PATENTS

| Number | Country | Date |
|---|---|---|
| 37,538 | Denmark | May 30, 1927 |

OTHER REFERENCES

Van Heerden, "The Crystal Counter," 1945.